(12) United States Patent
Yen

(10) Patent No.: US 7,938,421 B2
(45) Date of Patent: May 10, 2011

(54) COLLAPSIBLE AXLE FOR VELOCIPEDE

(76) Inventor: Sylvester Yen, Short Hills, NJ (US)

( * ) Notice: Subject to any disclaimer, the term of this patent is extended or adjusted under 35 U.S.C. 154(b) by 41 days.

(21) Appl. No.: 12/321,054

(22) Filed: Jan. 15, 2009

(65) Prior Publication Data
US 2010/0133021 A1     Jun. 3, 2010

Related U.S. Application Data

(60) Provisional application No. 61/011,491, filed on Jan. 17, 2008.

(51) Int. Cl.
*B62K 17/07*     (2006.01)
(52) U.S. Cl. .................. 280/278; 301/125; 301/128
(58) Field of Classification Search ............. 180/21, 180/210; 301/125, 128, 6.9, 9.1, 111.01, 301/110.5; 280/279, 288, 650
See application file for complete search history.

(56) References Cited

U.S. PATENT DOCUMENTS

| | | | | |
|---|---|---|---|---|
| 1,096,634 A * | 5/1914 | Lea et al. | ................. | 280/281.1 |
| 2,556,814 A * | 6/1951 | Love | ................. | 280/659 |
| 4,576,389 A * | 3/1986 | Villaveces et al. | ......... | 280/43.16 |
| 4,582,448 A | 4/1986 | Costello | | |
| 4,822,065 A | 4/1989 | Enders | | |
| 5,326,128 A * | 7/1994 | Cromley, Jr. | ................ | 280/656 |
| 5,788,254 A * | 8/1998 | Davis | ................. | 280/282 |
| 5,879,022 A | 3/1999 | Winton | | |
| 6,089,675 A * | 7/2000 | Schlanger | ................ | 301/124.2 |
| 6,409,281 B1 * | 6/2002 | Kanehisa et al. | ......... | 301/110.5 |
| 6,481,735 B1 | 11/2002 | Hilk | | |
| 7,090,308 B2 * | 8/2006 | Rose et al. | ................ | 301/110.5 |
| RE39,528 E * | 3/2007 | Kanehisa et al. | ......... | 301/110.5 |
| 2002/0180256 A1 | 12/2002 | Reich | | |

* cited by examiner

*Primary Examiner* — Tony H. Winner
(74) *Attorney, Agent, or Firm* — Gearhart Law, LLC

(57) ABSTRACT

A supporting member that carries at least 1 wheel and either rotates with the wheel to transmit mechanical power to and from it, and allows the wheel to rotate freely on it. The axle is an invention by itself and there is no prior art which has the axle attached to the housing. The axle and wheels can be removed and is therefore easier to ship. The axle can be used in a tricycle, trailer, caboose or any human or mechanical powered vehicle.

16 Claims, 7 Drawing Sheets

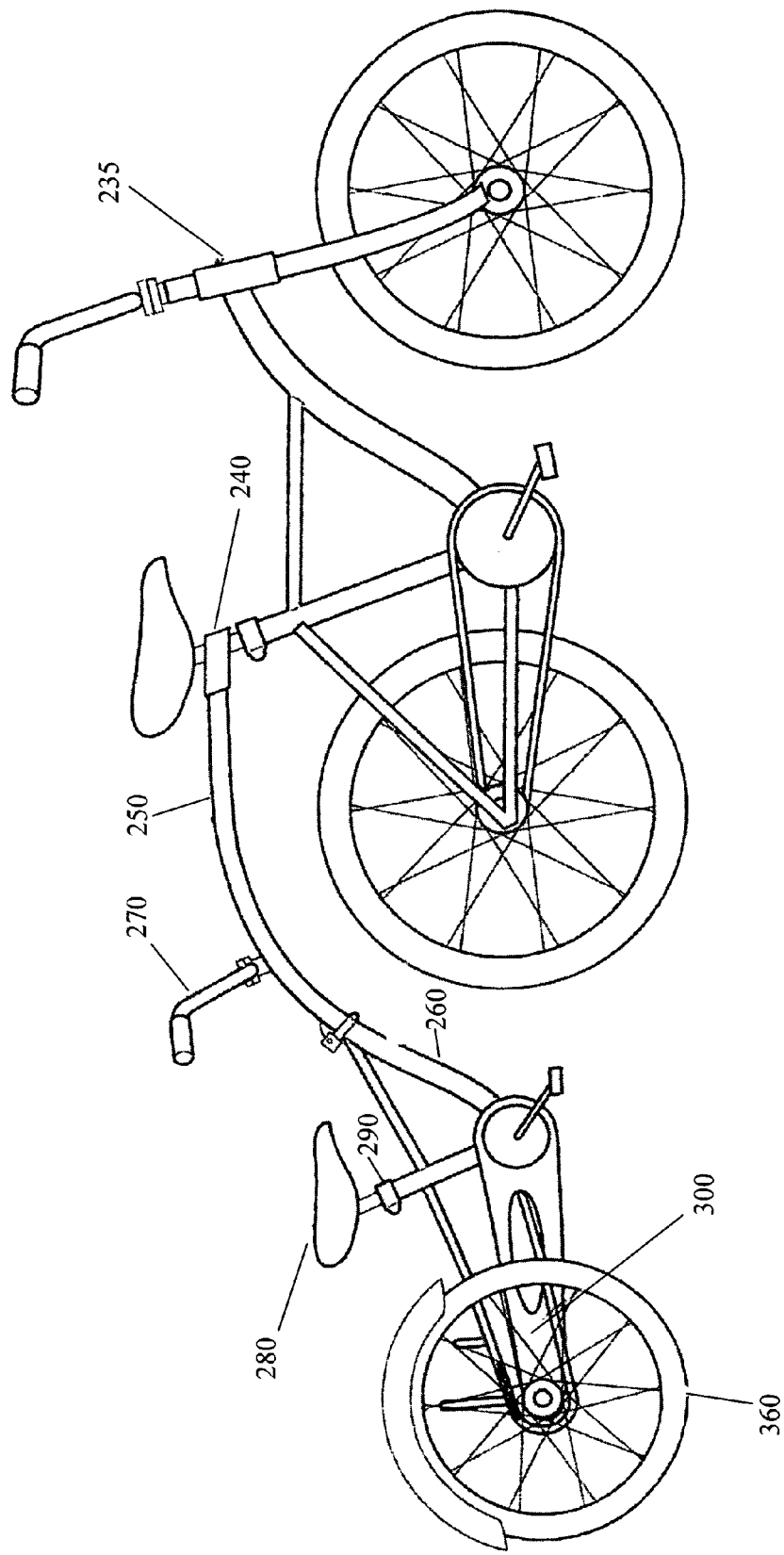

US 7,938,421 B2

COLLAPSIBLE AXLE FOR VELOCIPEDE

CLAIM OF PRIORITY

This application claims priority to U.S. Ser. No. 61/011,491 filed Jan. 17, 2008, the contents of which are incorporated herein by reference.

FIELD OF THE INVENTION

The invention relates to a detachable and extendable axle which can be used on a velocipede. The present invention relates to the field of manufacturing, and more specifically to an assembly which is attached to the driving mechanism of the vehicle being towed or moved.

BACKGROUND OF THE INVENTION

Examples of the prior art are shown in the following:

U.S. Publication Number 20020180256 teaches an apparatus and method for attaching a wheel to an axle. The apparatus comprises a wheel with a hub for insertion into an indentation in the end of the axle and a non-cylindrically-symmetrical stud attached to the axle that is concentric with the axis of rotation of the wheel and axle, attaching the wheel to the axle.

U.S. Pat. No. 4,582,448 teaches an assembly for allowing quick removal of a wheel from a vehicle is provided. The original wheel axle is replaced with an elongated axle which is adapted to extend through a block clamped to the vehicle frame. The block includes a spring-biased plunger which interfits with an annular groove at the end of the axle to lock the wheel and axle in place. The plunger is withdrawn from the groove to release the axle and allow one to readily remove the wheel. Alternately, an indented shaft fits within the groove to lock the axle. Upon rotation of the shaft to align the indentation over the groove, the axle may be released and withdrawn from the block.

U.S. Pat. No. 5,879,022 teaches a device and method for converting a golf bag to a golf cart. The device has a hardside rectangular shaped main portion. The bottom is canted with a plate having a connector for a removable axle. The axle is locked but can be attached or removed as desired. The top has tubing for receiving the clubs, accessories, and the axle when detached from the connector. Wheels can be joined to the axle or else stored in internal storage compartments within the device. A cover having zippered access to the clubs extends above the device. When opened, the cover falls to the side, out of the way.

U.S. Pat. No. 6,481,735 teaches an apparatus for carrying a load behind a bicycle. The apparatus includes a carriage adapted to carry a load, and at least one wheel rotatably connected to the carriage. A hitch assembly is coupled to the carriage and includes at least one latch mechanism removably connectable to a bicycle to couple the carriage to the bicycle. The latch mechanism is adapted to removably connect to a skewer assembly receivable in the hub of a rear wheel of the bicycle.

U.S. Pat. No. 4,822,065 teaches a collapsible cargo carrier which comprises rigid framework for supporting cargo and an axle and wheel assembly for moving the cargo over a surface. A generally rectangular framework supports the cargo and is coupled with the axle by triangular supports which are releasably hinged to the cargo carrying framework. By removing two locking pins, the axle is released from the framework and the triangular supports can be collapsed against the cargo carrying portion of the framework. Mounting brackets are provided for storing the axle and wheel assembly on the side of the framework when the other components have been collapsed. Accessories are provided for accommodating larger loads and for facilitating movement of loads by providing elongated handles on the carrier.

The present invention relates to the field of manufacturing, and more specifically to an assembly which is attached to the driving mechanism of the vehicle being towed or moved.

Prior inventions are cumbersome to ship and limited to a fixed axle length. In the use of light-duty or portable vehicles, such as bicycles, trailer bikes, wagons, and the like, it is common to transport the vehicle within a car. However, given the energy shortage and price increase of gas, as well as downscaling of personal automobiles, it is very difficult to position the aforementioned portable vehicles within the trunk of a small car or the back seat thereof.

Having the ability to easily dismember the velocipede to fit into a smaller space greatly facilitates handling, movement and/or storage. Drivetrain components require less disassembly or specialized tools because of the unique way the extendible length axle and axle housing are structured. The axle housing can be taken apart by removing the pins or similar fixing mechanism, from the axle housing to free the axle. Since the axle has an adjustable length, when the pins are removed, it can decrease in size allowing for easier shipping. To reassemble, the axle easily slides back into the axle housing and the pins are reinserted. The wheels can be removable on either side of the axle, and the handlebars, seat and pedals are removed by unscrewing removable clamps. There are only five parts altogether, as illustrated in FIG. 3.

Shipping charges are reduced because the parts can be disassembled to fit a smaller shipping container. The time to ship the item to consumers is expedited because a standard UPS truck can be used as opposed to a freight truck.

In other embodiments, the extendable length axle also allows width between back wheels to be expanded in order to accommodate heavier or wider load and also provide more stability by evenly distributing weight between the back wheels for better traction and a lower center of gravity.

Often there is one drive wheel controlling the movement of the velocipede, but with the axle housing having the ability to attach directly through the axle, this allows both wheels to engage in the driving process—like having rear wheel drive in a car. Therefore, the braking can be directly applied to the axle housing from the pedals as opposed to directly on the wheels from a cable running from the handlebars.

One preferred embodiment of this invention is illustrated in the accompanying drawings and will be described in more detail herein below. Also included in the illustrated drawings is a perspective view of an alternate embodiment of the invention. Other objects and advantages of the present invention will become apparent from the following descriptions, taken in connection with the accompanying drawings

SUMMARY OF THE INVENTION

In accordance with the preferred embodiment of the invention, there is disclosed an axle assembly, comprising an axle housing, having a drive mechanism attached thereto, a removable axle disposed within the axle housing, and a fixing mechanism which keeps the removable axle within the axle housing when the fixing mechanism is actuated, and allows the removable axle to be withdrawn from the axle housing when the fixing mechanism is deactivated.

The axle assembly containing the removable axle has a means for attaching at least one wheel to the removable axle. The removable axle has at least one extendable axle assembly, and a sub axle fixing assembly. The drive mechanism is a gear or sprocket, the axle housing has first and second ends, and said first and second ends are tapered, and the axle housing has first and second rotation assemblies attached. The fixing assembly comprises a hole in the housing assembly, an aligned hole in the removable axle, and a pin or bolt which may be simultaneously inserted through said housing assembly hole and the aligned hole.

Also disclosed, is an article of manufacture comprising a velocipede having an axle assembly, wherein the axle assembly has an axle housing, a removable axle disposed within the axle housing, and a fixing mechanism which keeps the removable axle within the axle housing when the fixing mechanism is actuated, and allows the axle to be withdrawn from the axle housing when the fixing mechanism is deactivated.

The velocipede can be a trailer bike, quadracycle, a quadracycle with two separate and attachable frames, a tricycle or any other appropriate alternate embodiment. The velocipede can be powered with human power, gas or electric power and contains a removable axle with a means for attaching at least one wheel to the removable axle. The drive mechanism is a gear or sprocket, the axle housing has first and second rotation assemblies are attached. The fixing assembly comprises a hole in the housing assembly, an aligned hole in the removable axle, and a pin or bolt which may be simultaneously inserted through said housing assembly hole and aligned hole. The removable axle has at least one extendable axle assembly.

BRIEF DESCRIPTION OF THE DRAWINGS

FIG. 5 is a side view of a preferred embodiment of the invention also showing a bicycle attached.

DESCRIPTION OF THE PREFERRED EMBODIMENTS

Figure 1:
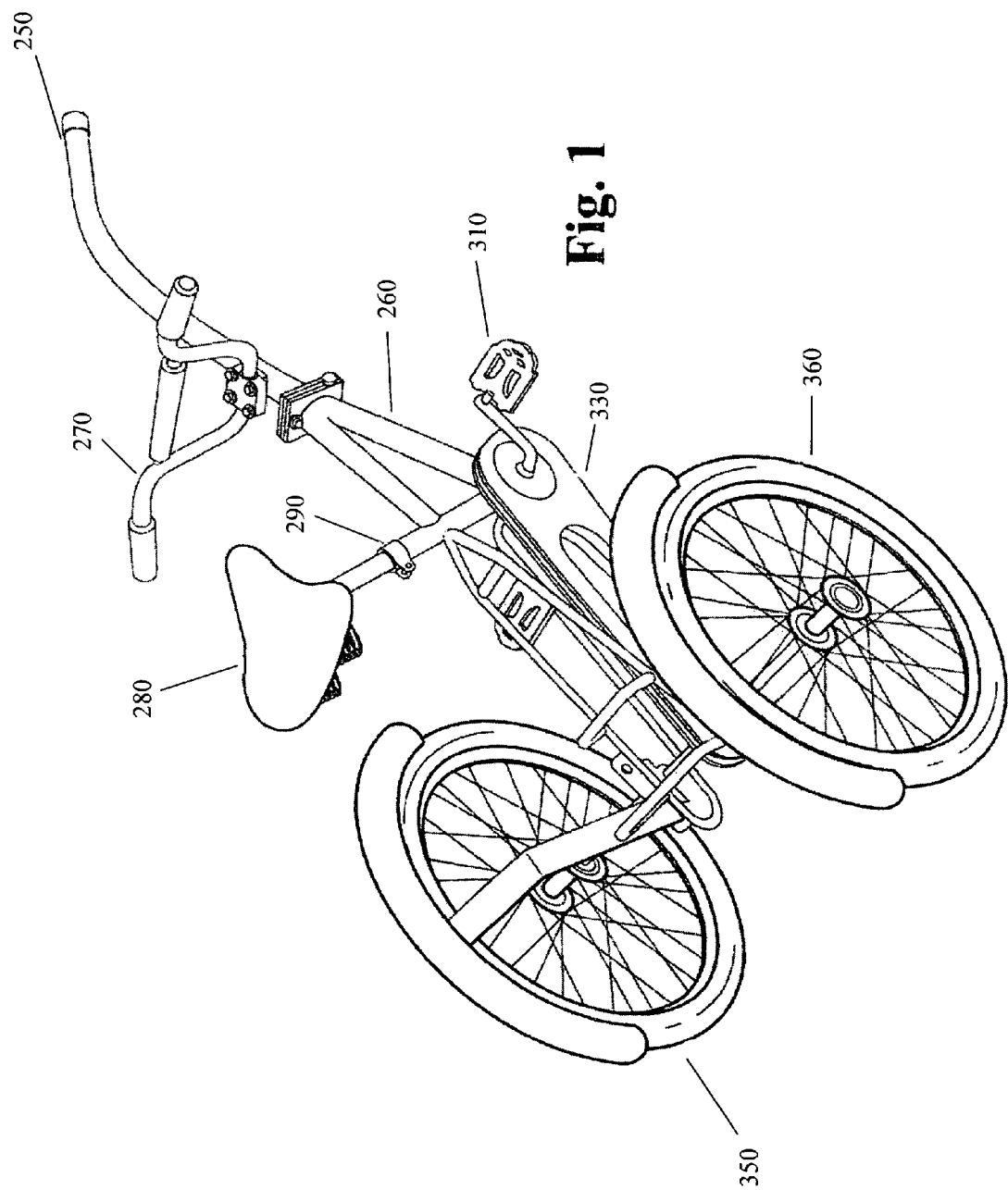
FIG. 1 is a perspective view of a preferred embodiment of the invention.

The preferred embodiments of the present invention will now be described with reference to FIG. 1-8 of the drawings. Identical elements in the various figures are identified with the same reference numerals. It is to be understood, however that the present invention may be embodied in various forms. Therefore, specific details disclosed are not to be interpreted as limiting, but rather as a basis for the claims to employ the present invention in virtually any appropriately detailed system, structure or manner.

While the dimensions of the parts are not critical, preferred dimensions for the wheels and frame are __20 inch diameter wheels_having a frame of length 48 inches, a width 7 inches and a height 20 inches.

FIG. 1 is a perspective view of a preferred embodiment of the invention. The figures shows a trailer bike of the type available from Morgan Cycle of New Jersey. It can be compacted to fit in a shipping carton of the size 40 inches in length by 9 inches in width, and 20 inches in height. The attachment assembly 250, handlebars 270, frame 260, and pedals 310 are shown, but it should be understood that the invention covers any kind of power train, including but not limited to electric or gas, or another powered mechanical means. The frame 260 is made of a material including but not limited to steel alloy or aluminum tubing assembled by brazing, welding, or nuts and bolts. The chain guard 330 protects clothing and moving parts from oil and spray and a protective covering for the chain 340 (not seen). Also shown are the left removable wheel 350 and right removable wheel 360.

Figure 2:
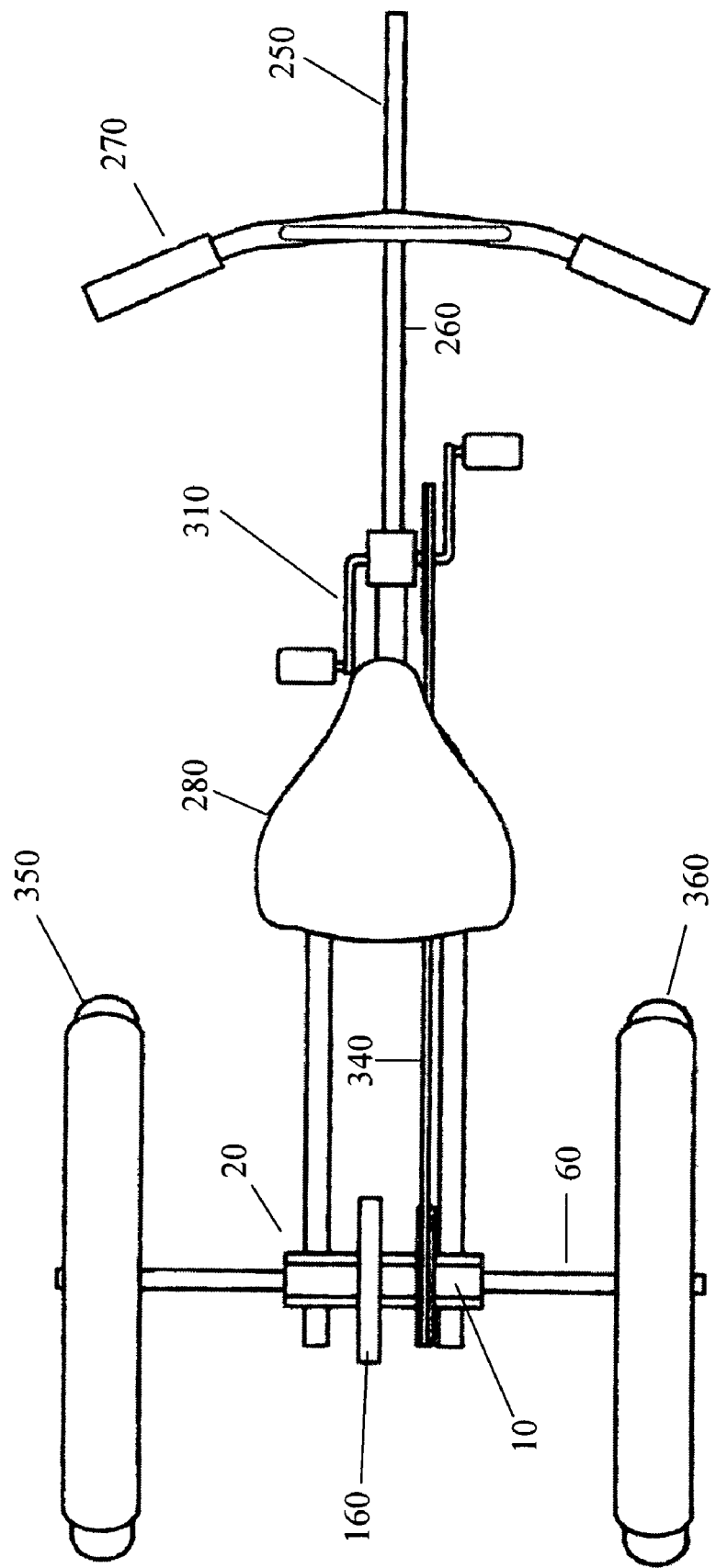
FIG. 2 is a top view of a preferred embodiment of the invention.

FIG. 2 is a top view of a preferred embodiment of the invention. FIG. 2 contains the axle assembly 10 shown covered by the axle housing 20 which is connected to a brake 160 and removable axle 60. The removable axle connects the left removable wheel 350 and the right removable wheel 360. Also shown are the attachment assembly 250, handlebars 270, frame 260, seat 280, pedals 310, and chain 340. The axle housing can be quite narrow, as small as 7 inches.

Figure 3:
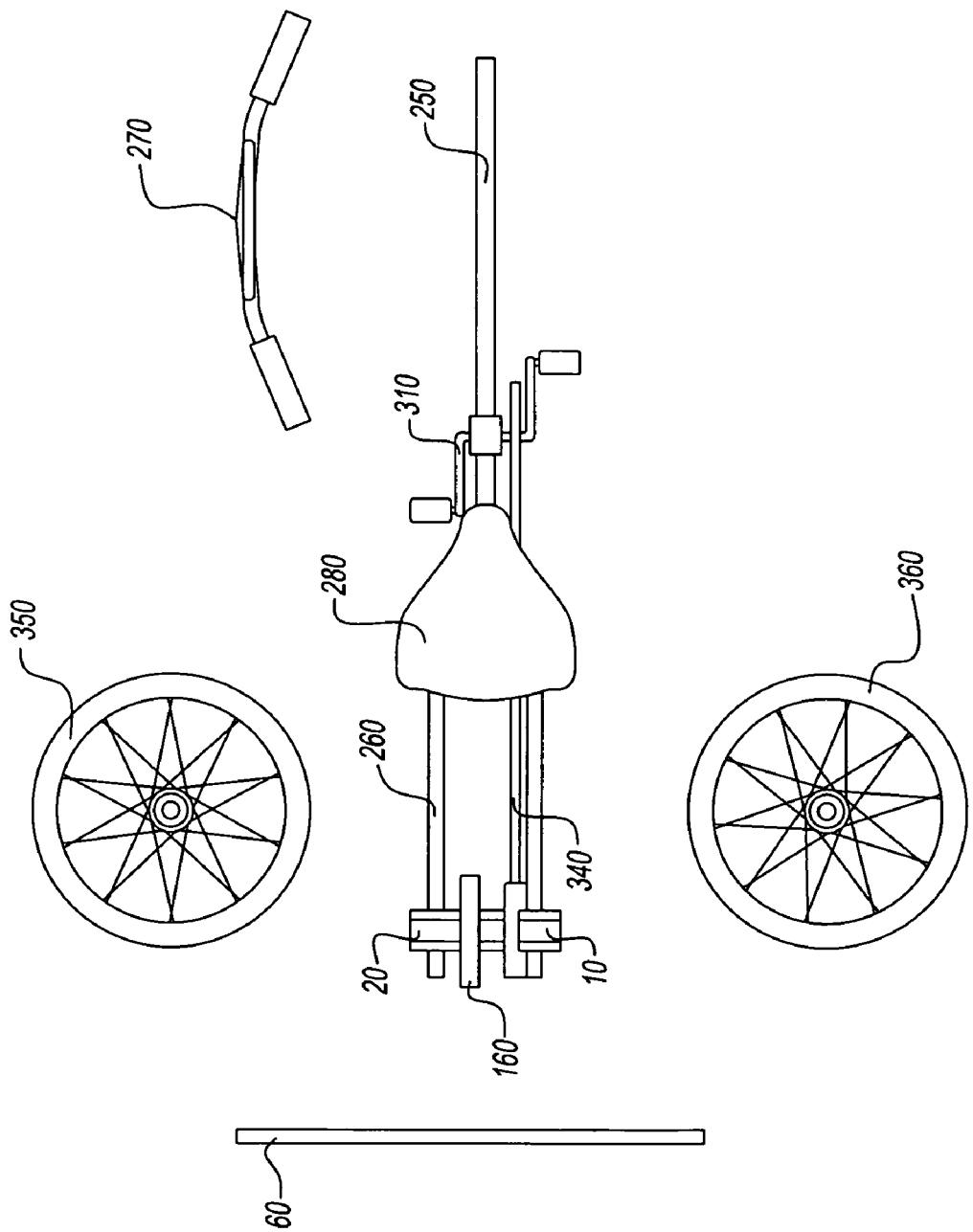
FIG. 3 is a top view of a preferred embodiment of the invention which shows parts disassembled

FIG. 3 is a top view of a preferred embodiment of the invention which shows parts disassembled, and contains the axle assembly 10 shown covered by the axle housing 20 which is connected to a brake 160 and removable axle 60. The attachment assembly 250, frame 260, handle bars 270, seat 280, pedals 310, chain 340, left removable wheel 350, and right removable wheel 360.

Figure 4:
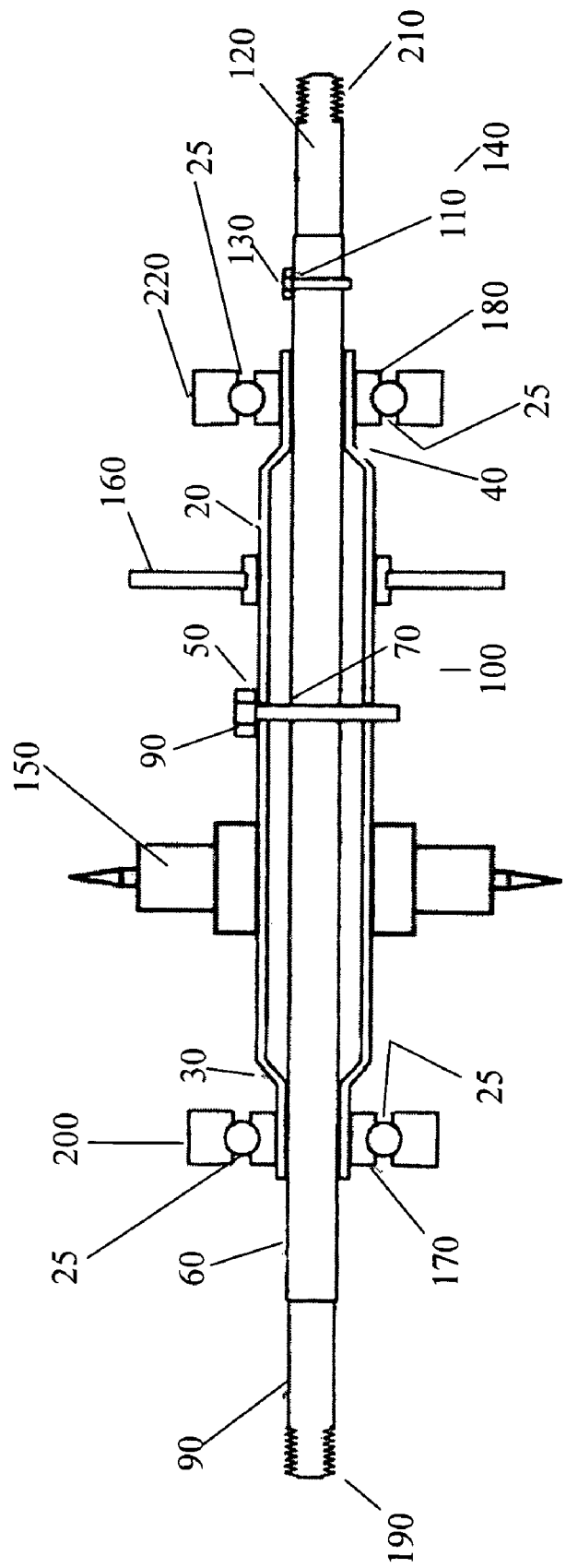
FIG. 4 is a detailed cut away and enlarged view of the removable axle of the present invention

FIG. 4 is a detailed cut away and enlarged view of the removable axle of the present invention, showing the extendible length axle. FIG. 4 includes the removable axle 60 which is shown contained within the axle housing 20, which has a first rotation assembly 170, and second rotation assembly 180. The first rotation assembly 170 has a first frame attachment point 200, where the rotation point attaches to the frame 260, and a second rotation assembly 180, has a second frame attachment point 220 where the rotation point attaches to the frame 260. The first rotation assembly 170 and second rotation assembly 180 are assemblies that connect to the frame of the velocipede and allow housing 20 and axle 60 to rotate. The first rotation assembly 170 and second rotation assembly 180 may contain a machine part such as a bearing or bushing 25 which allows the axle housing 20 to rotate freely. The bearing or bushing could also be a removable piece of plastic, soft metal or graphite-filled sintered metal that lines support for the axle housing 20. The axle housing 20 also has a brake 160 designed to slow down or stop motion by steadily or evenly applying force from pedals or hand brake. The drive mechanism 150 is attached to the axle housing 20 to transmit mechanical power from the chain 340 to the sprocket 320 which has a tooth on the periphery of a wheel or cylinder to engage the links of a chain. The axle housing 20 contains a pin hole 50 which serves as a place for the first sub axle pin 90 to enter to provide a fixing mechanism which keeps the removable axle 60 within the axle housing 20 when the fixing mechanism is activated and allows the removable axle 60 to be withdrawn from the axle housing 20 when the fixing mechanism is deactivated. In another embodiment, the removable axle 60 also contains a second sub axle pin 130 to enter providing a fixing mechanism which keeps the second sub axle 120 to be elongated when deactivated. The first sub axle 80 and second sub axle 120 will contain a device such as threads, as shown, cotter pins or like means to provide a method of removably attaching the wheels.

FIG. 5 is a side view of a preferred embodiment of the invention attached to a bicycle.

FIG. 5 also contains a view of a bike 235, trailer 240, attachment assembly 250, frame 260, handle bars 270, seat 280, seat post claim 290, power train conventional personal computer 300, and right removable wheel 360.

Figure 7:
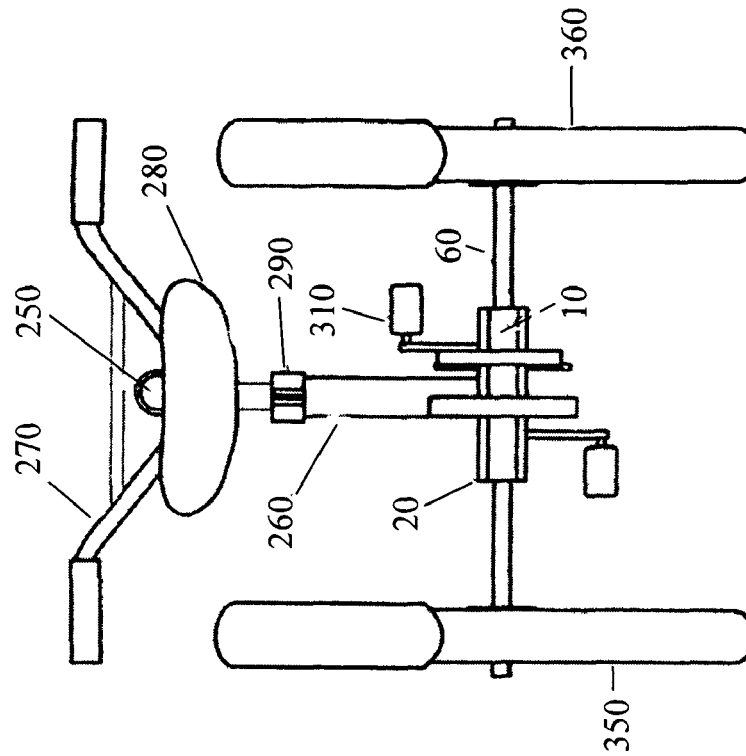
FIG. 7 is a rear view of a preferred embodiment of the invention.
Figure 6:
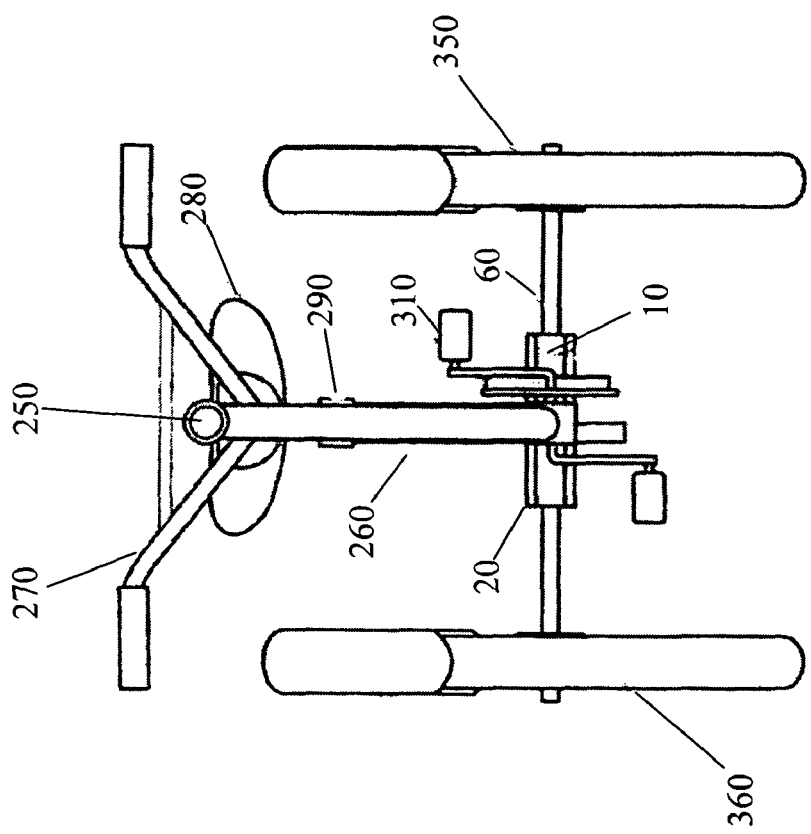
FIG. 6 is a front view of a preferred embodiment of the invention.

FIGS. 6 and 7 show the front and rear view of the preferred embodiment of the invention respectively. Specific parts are the axle assembly 10 shown covered by the axle housing 20 which contains the removable axle 60. Also shown are pedals 310, left removable wheel 350, right removable wheel 360, attachment assembly 250, frame 260, handle bars 270, seat 280, and seat post clamp 290.

Figure 8:
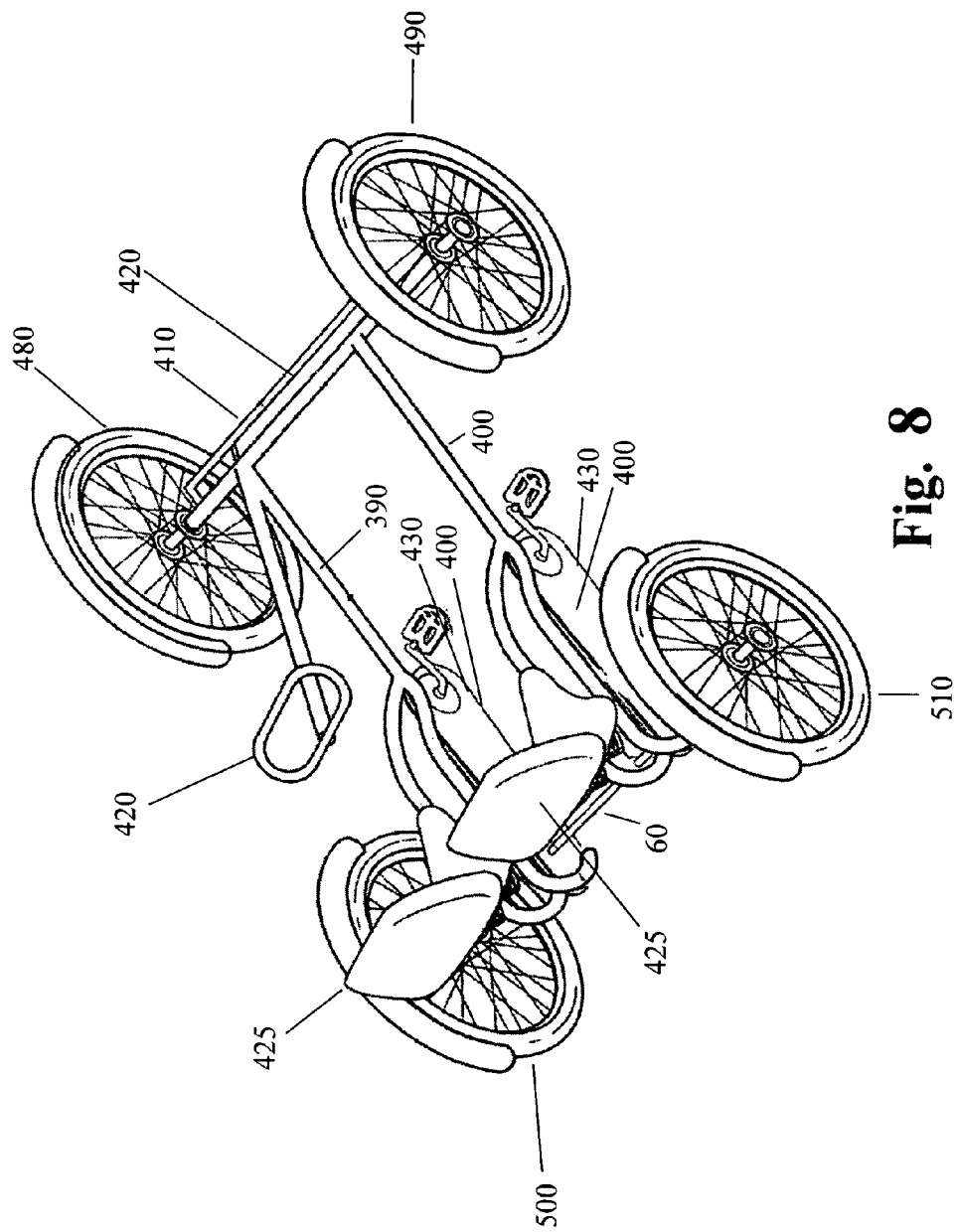
FIG. 8 is a perspective view of an alternate embodiment of the invention.

FIG. 8 is a perspective view of an alternate embodiment of the invention. This view shows a top diagonal view of a quadracycle 370. Parts shown include the left frame 390, right frame 400, separator 410, steering assembly 420, seats 425, power trains 430, pedals 440, sprocket 450 (not shown), chain guards 460, chain 470, left front removable wheel 480, right front removable wheel 490, left rear removable wheel 500, and right rear removable wheel 510. While left frame 390 and right frame 400 may be one piece, in another embodiment, left frame 390 and right frame 400 can be taken apart by removing the separator 410. The steering assembly 420 provides the directional control of the vehicle and is connected to the left frame 390. Seats 425 are connected to each frame side. Each side of the vehicle has a power train 430 providing movement to the vehicle, and includes the pedals 450, chain 470, sprocket 450, and chain guard 460.

Although this invention has been described with a certain degree of particularity, it is to be understood that the present disclosure has been made only by way of illustration and that numerous changes in the details of construction and arrangement of parts may be resorted to without departing from the spirit and the scope of the invention as defined by the appended claims.

I claim:

1. An axle assembly, comprising:
   an axle housing, having a drive mechanism attached thereto;
   a removable axle disposed within the axle housing;
   a fixing mechanism which keeps the removable axle within the axle housing when the fixing mechanism is actuated, and allows the removable axle to be withdrawn from the axle housing when the fixing mechanism is deactivated, said fixing mechanism comprising a hole in the axle housing, an aligned hole in the removable axle, and a pin or bolt which may be simultaneously inserted through said axle housing hole and the aligned hole; and
   wherein the axle housing has first and second ends, and said first and second ends are tapered.

2. The axle assembly of claim 1, wherein the removable axle has a means for attaching at least one wheel to the removable axle.

3. The axle assembly of claim 1, wherein the drive mechanism is a gear or sprocket.

4. The axle assembly of claim 1, wherein the axle housing has first and second rotation assemblies.

5. The axle assembly of claim 1, wherein the removable axle has at least one extendable axle assembly.

6. The axle assembly of claim 5, wherein the at least one extendable axle assembly has a sub axle fixing assembly.

7. An article of manufacture comprising:
   a velocipede having an axle assembly, wherein the axle assembly has comprises:
   an axle housing;
   a removable axle disposed within the axle housing;
   a fixing mechanism which keeps the removable axle within the axle housing when the fixing mechanism is actuated, and allows the axle to be withdrawn from the axle housing when the fixing mechanism is deactivated, said fixing mechanism comprising a hole in the axle housing, an aligned hole in the removable axle, and a pin or bolt which may be simultaneously inserted through said axle housing hole and the aligned hole; and
   wherein the axle housing has first and second ends, and said first and second ends are tapered.

8. The article of claim 7, wherein the velocipede is a trailer bike.

9. The article of claim 7, wherein the velocipede is a quadricycle.

10. The article of claim 9, wherein the quadricycle has two seperatable frames.

11. The article of claim 7, wherein the velocipede is a tricycle.

12. The article of claim 7, wherein the velocipede is powered with human power.

13. The article of claim 7, wherein the removable axle has a means for attaching at least one wheel to the removable axle.

14. The article of claim 7, wherein the drive mechanism is a gear or sprocket.

15. The article of claim 7, wherein the axle housing has first and second rotation assemblies.

16. The article of claim 7, wherein the removable axle has at least one extendable axle assembly.

* * * * *